United States Patent
Huang (10) Patent No.: US 9,228,820 B2
(45) Date of Patent: Jan. 5, 2016

(54) STRAIGHTNESS MEASURING INSTRUMENT (71) Applicant: Chin-Chang Huang, Taichung (TW)

(72) Inventor: Chin-Chang Huang, Taichung (TW)

(*) Notice: Subject to any disclaimer, the term of this patent is extended or adjusted under 35 U.S.C. 154(b) by 139 days.

(21) Appl. No.: 14/178,120

(22) Filed: Feb. 11, 2014

(65) Prior Publication Data

US 2015/0226536 A1    Aug. 13, 2015

(51) Int. Cl.
*G01B 3/00* (2006.01)
*G01B 5/00* (2006.01)
*G01B 1/00* (2006.01)
*G01B 5/28* (2006.01)
G01B 21/22 (2006.01)
G01B 5/25 (2006.01)
G01B 3/14 (2006.01)
G01B 5/20 (2006.01)
G01B 5/252 (2006.01)

(52) U.S. Cl.
CPC .............. *G01B 5/285* (2013.01); *G01B 5/0004* (2013.01); *G01B 5/201* (2013.01); *G01B 5/205* (2013.01); *G01B 5/252* (2013.01)

(58) Field of Classification Search
CPC ........ G01B 5/285; G01B 5/252; G01B 5/201; G01B 5/0004; G01B 5/205
USPC .................... 33/550, 533, 551, 553
See application file for complete search history.

(56) References Cited

U.S. PATENT DOCUMENTS

| | | | | | |
|---|---|---|---|---|---|
| 2,389,206 | A | * | 11/1945 | Banta | B21D 3/00 33/506 |
| 2,470,404 | A | * | 5/1949 | Kloos | G01B 5/201 33/533 |
| 3,091,867 | A | * | 6/1963 | Ryan, Jr. | G01B 5/163 33/199 R |
| 3,163,305 | A | * | 12/1964 | Stanton | G01B 5/252 33/534 |
| 3,348,057 | A | * | 10/1967 | Burroughs | G01B 11/303 250/210 |
| 3,805,624 | A | * | 4/1974 | Martin | G01M 1/36 73/462 |
| 3,823,588 | A | * | 7/1974 | Ancarrow, Jr. | B21D 3/02 72/111 |
| 3,846,998 | A | * | 11/1974 | Lock | B21D 3/16 33/506 |
| 4,203,308 | A | * | 5/1980 | Davis | B21D 3/16 72/31.03 |
| 4,693,010 | A | * | 9/1987 | Sills | B65H 7/125 33/501.03 |
| 4,700,439 | A | * | 10/1987 | Hines | B21D 3/10 228/15.1 |
| 5,301,436 | A | * | 4/1994 | Johnston | F42B 35/02 33/506 |
| 6,041,512 | A | * | 3/2000 | Wacke | G01B 7/06 33/522 |
| 7,162,903 | B2 | * | 1/2007 | Juranitch | B21D 3/10 72/110 |
| 7,771,186 | B2 | * | 8/2010 | Sakata | B29C 53/083 264/340 |
| 2010/0058902 | A1 | * | 3/2010 | Bartz | B23D 79/12 82/124 |

* cited by examiner

*Primary Examiner* — Laura Martin
*Assistant Examiner* — Rhyan C Lange
(74) *Attorney, Agent, or Firm* — Kolisch Hartwell, P.C.

(57) ABSTRACT

A straightness measuring instrument includes a base, two loading units, a center clamping apparatus, and a measure apparatus. The base includes two support rods and a sliding rod. The loading units are mounted on the base and are arranged along an axial direction of the support rods at intervals. The center clamping apparatus is mounted in the base and includes a fixed seat and a movable seat. The measure apparatus is mounted movably around the sliding rod. The loading units are adjustable for easy and quick movement depending on the length of a workpiece. Also, the center clamping apparatus can assist with clamping the workpiece that has different diameters.

13 Claims, 10 Drawing Sheets

STRAIGHTNESS MEASURING INSTRUMENT

BACKGROUND OF THE INVENTION

1. Field of the Invention

The present invention relates to a measuring instrument and more particularly to a straightness measuring instrument.

2. Description of Related Art

Figure 10:
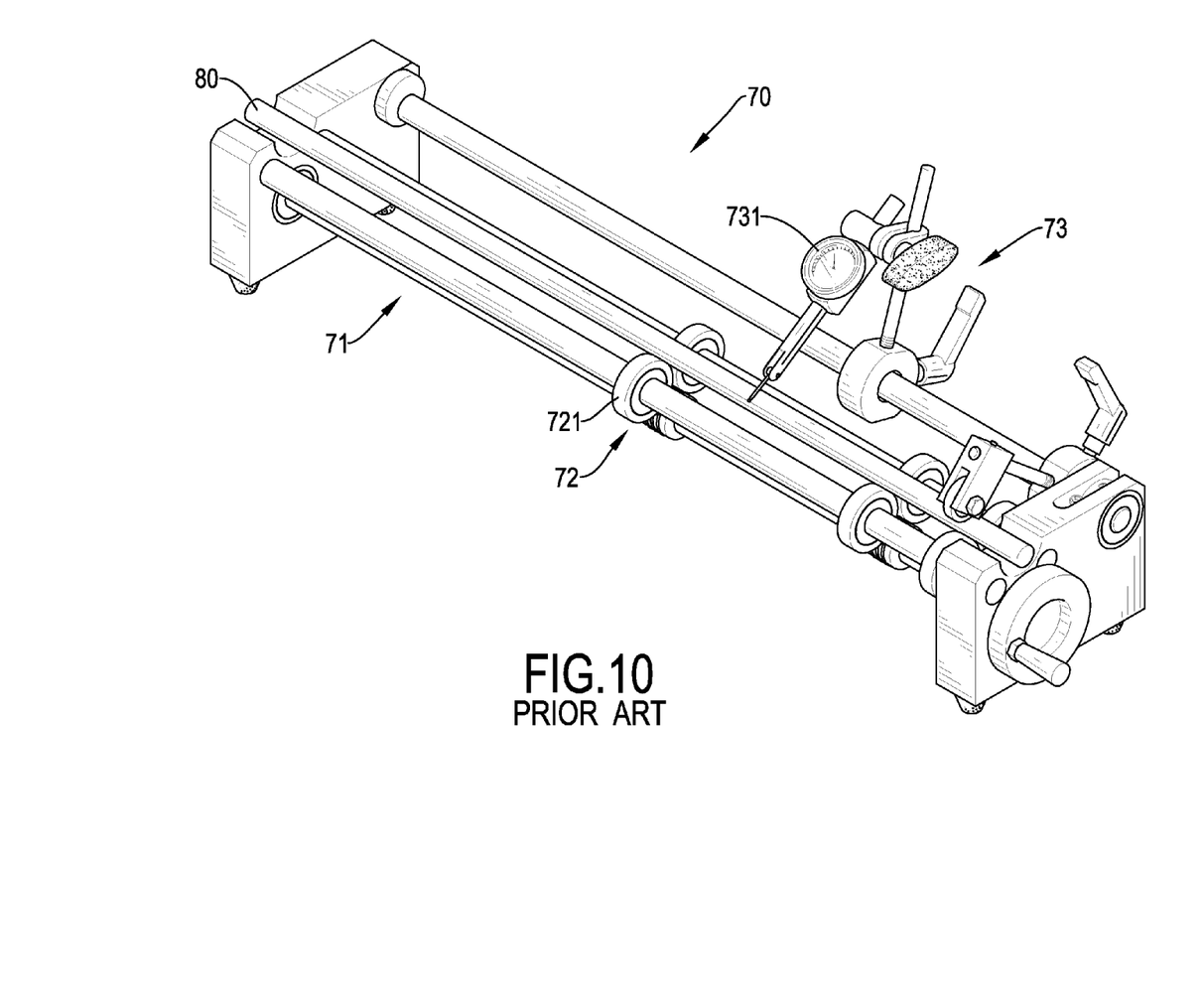
FIG. 10 is a perspective view of a conventional straightness measuring instrument in accordance with the prior art.

With reference to FIG. 10, a conventional straightness measuring instrument 70 includes a base 71, two support units 72 and a measure unit 73. The support units 72 and the measure unit 73 are mounted on the base 71 and arranged parallelly. Each support unit 72 has two rollers 721. The measure unit 73 has an indicator 731. A workpiece 80 is placed on the rollers 721 of each support unit 72. The workpiece 80 is a long stick and has an identical diameter. In order to measure the straightness of the workpiece 80, the indicator 731 needs to be leaned against the periphery of the workpiece 80. If the workpiece 80 is bent or not straight enough, the pointer of the indicator 731 will be moved when the workpiece 80 is rotated by the support unit 72. Therefore, the conventional straightness measuring instrument 70 can measure the straightness of the workpiece 80.

If the workpiece 80 has different diameters at different parts of the workpiece 80, the workpiece 80 cannot be placed on the rollers 721 horizontally and be measured exactly by the measure unit 73. In addition, the rollers 721 of each support unit 72 are arranged separately and are hard to be moved. If the length of the workpiece 80 is shorter than a distance between the rollers 721, the workpiece 80 cannot be placed on the rollers 721.

To overcome the shortcomings of the conventional straightness measuring instrument, the present invention provides a straightness measuring instrument to mitigate or obviate the aforementioned problems.

SUMMARY OF THE INVENTION

The main objective of the invention is to provide a straightness measuring instrument; the straightness measuring instrument includes a base, two loading units, a center clamping apparatus, and a measure apparatus.

The base includes two support seats, two support rods, a driving rod, a driving mechanism, and a sliding rod; the support seats are upright straight and are parallel with each other, the support rods are mounted through one side of the support seats and are parallel with each other, the driving rod is mounted through the support seats and is located under the support rods, the driving mechanism is mounted on one of the support seats and is connected with the driving rod, and the sliding rod is mounted through another side of the support seats and is parallel to the support rods.

The loading units are mounted on the base and are arranged along an axial direction of the support rods at intervals; each loading unit includes a loading seat, two bearing units and a driving wheel; the loading seat is mounted movably around the support rods and the driving rod, the bearing units are mounted in the loading seat and are mounted around the support rods, and the driving wheel is mounted in the loading seat, is mounted around the driving rod, and abuts against the bearing units.

The center clamping apparatus is mounted on the base and includes a fixed seat mounted on one of the support seats and a movable seat movably mounted around the support rods and located opposite to the fixed seat, and the loading units are located between the fixed seat and the movable seat.

The measure apparatus is mounted movably around the sliding rod.

Other objects, advantages, and novel features of the invention will become more apparent from the following detailed description when taken in conjunction with the accompanying drawing.

DETAILED DESCRIPTION OF PREFERRED EMBODIMENT

Figure 1:
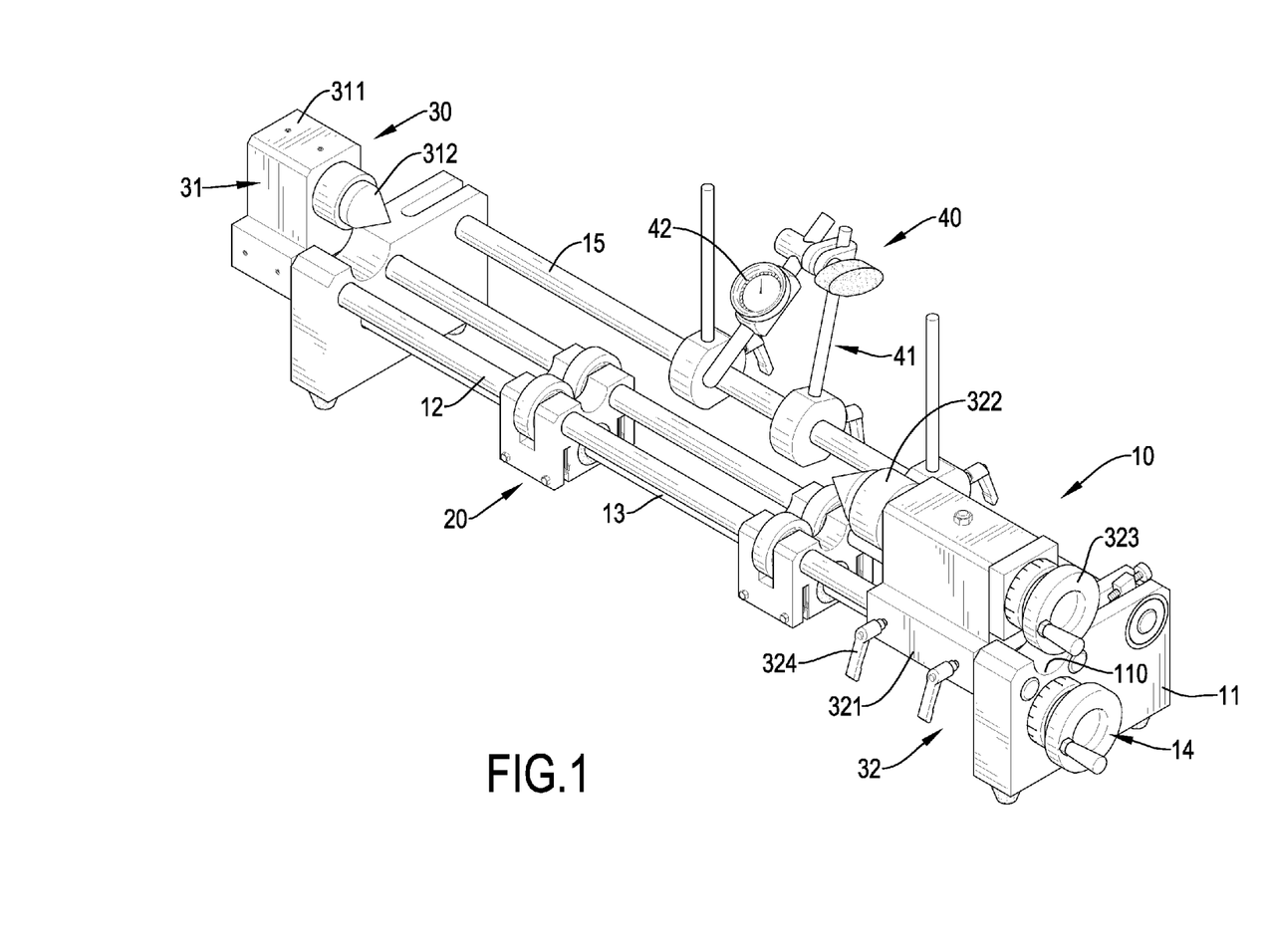
FIG. 1 is a perspective view of a straightness measuring instrument in accordance with the present invention.

With reference to FIG. 1, a preferred embodiment of a straightness measuring instrument in accordance with the present invention has a base 10, two loading units 20, a center clamping apparatus 30, and a measure apparatus 40.

Figure 2:
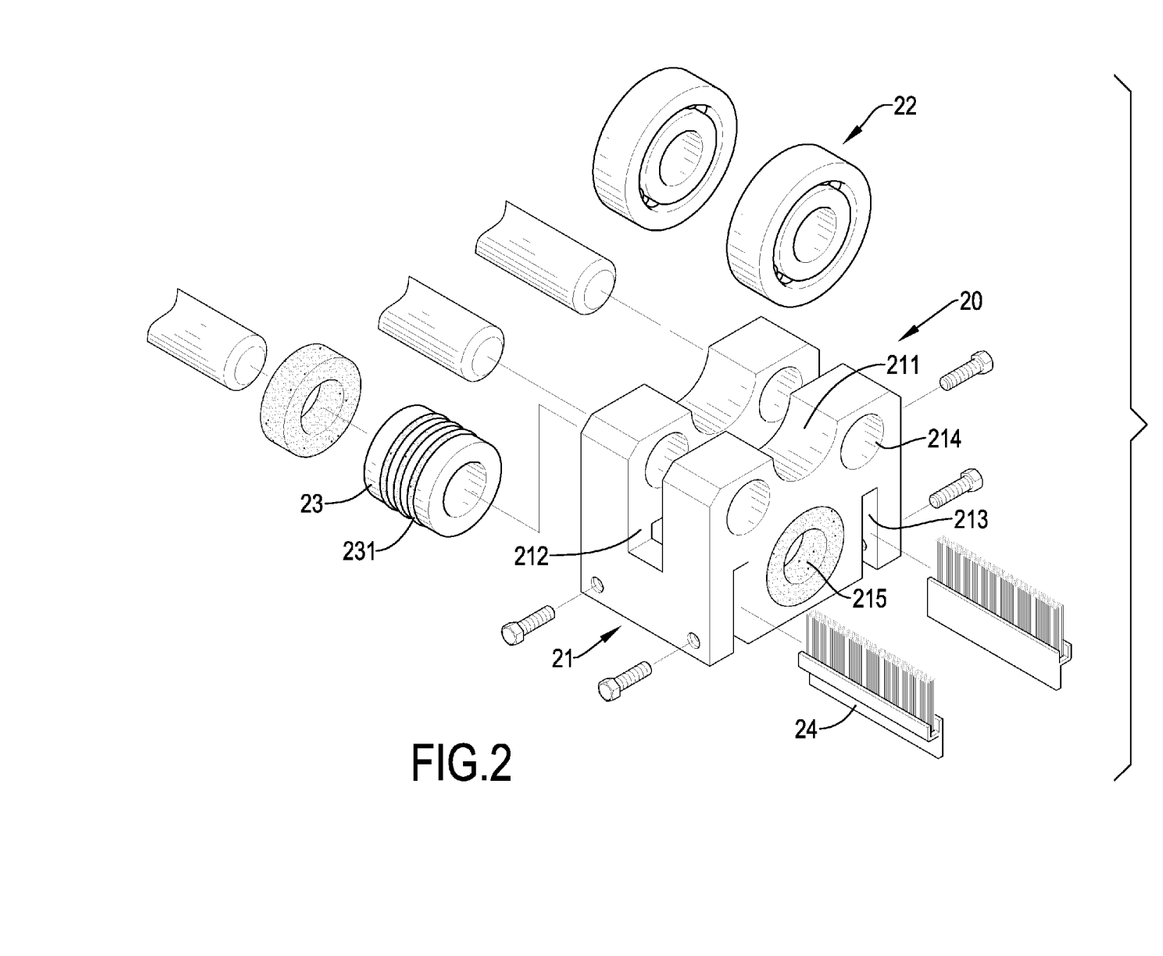
FIG. 2 is an exploded perspective view of a loading unit of the straightness measuring instrument in FIG. 1.

With reference to FIGS. 1 and 2, the base 10 includes two support seats 11, two support rods 12, a driving rod 13, a driving mechanism 14 and a sliding rod 15. The support seats 11 are upright straight and are parallel with each other. Each support seat 11 has a recess 110 formed on a top of the support seat 11. The support rods 12 are mounted through the support seats 11 and are parallel with each other. The driving rod 13 is mounted through the support seats 11 and is located under the support rods 12. The driving mechanism 14 is mounted on one of the support seats 11 and is connected with the driving rod 13. The driving mechanism 14 is a handwheel which is rotated by hands and drives the driving rod 13. The sliding rod 15 is mounted through the support seats 11 and is parallel to the support rods 12.

Figure 3:
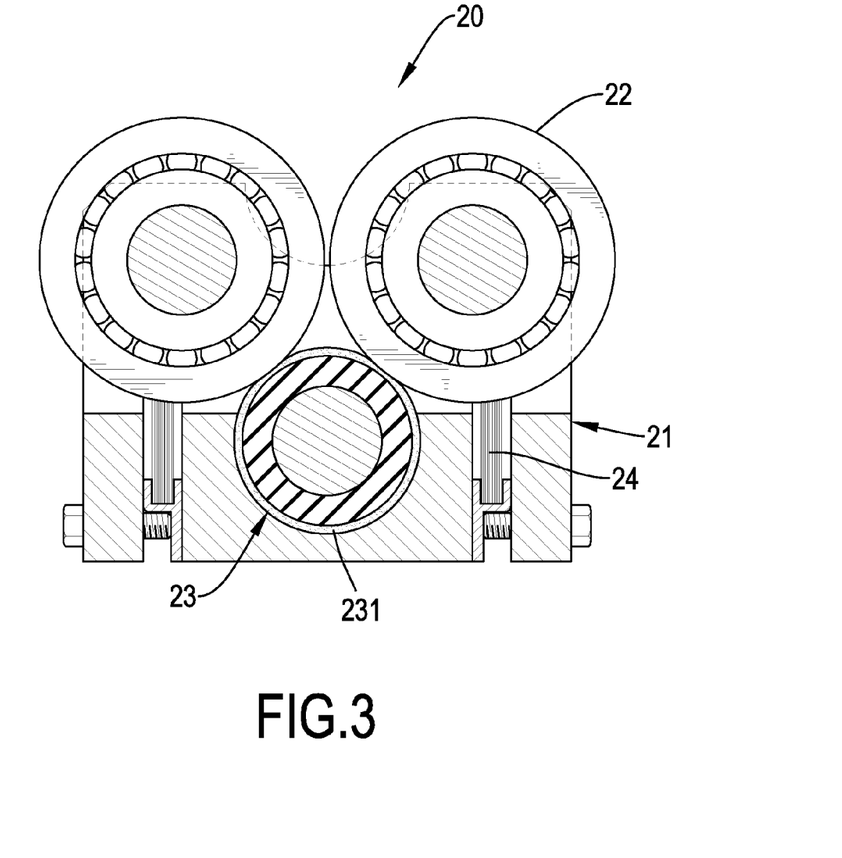
FIG. 3 is a cross-sectional side view of the loading unit of the straightness measuring instrument in FIG. 1.

With reference to FIGS. 2 and 3, the loading units 20 are mounted movably around the support rods 12 and the driving rod 13, and are arranged along an axial direction of the support rods 12 at intervals. Each loading unit 20 includes a loading seat 21, two bearing units 22, a driving wheel, 23 and two brushes 24. The loading seat 21 is rectangular and has a top face, a bottom face, two side faces, an abutment recess 211, a bearing recess 212, two brush recesses 213, two through holes 214 and a rod hole 215. The abutment recess 211 is semi-circular in cross-section and is formed on the top face of the loading seat 21. The bearing recess 212 is formed on the top face of the loading seat 21 and is formed across the abutment recess 211 perpendicularly. The brush recesses 213 are formed on the bottom face of the loading seat 21, communicate with the bearing recess 212, and are located correspondingly to the support rods 12 respectively. The through holes 214 and the rod hole 215 are formed through the side faces of the loading seat 21.

With reference to FIGS. 2 and 3, the bearing units 22 are mounted in the bearing recess 212 and align respectively with the through holes 214. The support rods 12 are inserted correspondingly and respectively into the through holes 214 and the bearing units 22. The driving wheel 23 is mounted in the bearing recess 212, is located under the bearing units 22, and aligns with the rod hole 215. The driving wheel 23 has multiple rubber rings 231 mounted around the periphery of the driving wheel 23. The rubber rings 231 abut against the bottom of each bearing unit 22. The driving rod 13 is inserted correspondingly into the rod hole 215 and the driving wheel 23, and rotates the driving wheel 23. Each brush 24 is mounted respectively in the brush recess 213 by screws and abuts the periphery of the bearing units 22.

With reference to FIG. 1, the center clamping apparatus 30 is mounted on the base 10 and includes a fixed seat 31 and a movable seat 32. The fixed seat 31 has a fixed seat base 311 and a center 312 mounted on the fixed seat base 311. The fixed seat base 311 is fastened on one of the support seats 11. The movable seat 32 is located opposite to the fixed seat 31. The loading units 20 are located between the fixed seat 31 and the movable seat 32. The movable seat 32 has a movable seat base 321, a movable center 322, a handwheel 323 and two locking units 324. The movable seat base 321 is mounted movably around the support rods 12. The movable center 322 is telescopic, is mounted on the movable seat base 321 and faces toward the center 312 of the fixed seat 31. The handwheel 323 is mounted on the movable seat base 321, is located opposite to the movable center 322 and connected with the movable center 322. The handwheel 323 is rotatable for moving the movable center 322 toward the center 312 of the fixed seat 31. The locking units 324 are adjustable, are mounted on one side of the movable seat base 321 and abut selectively the support rods 12 for locking and fixing the movable seat base 321.

Figure 4:
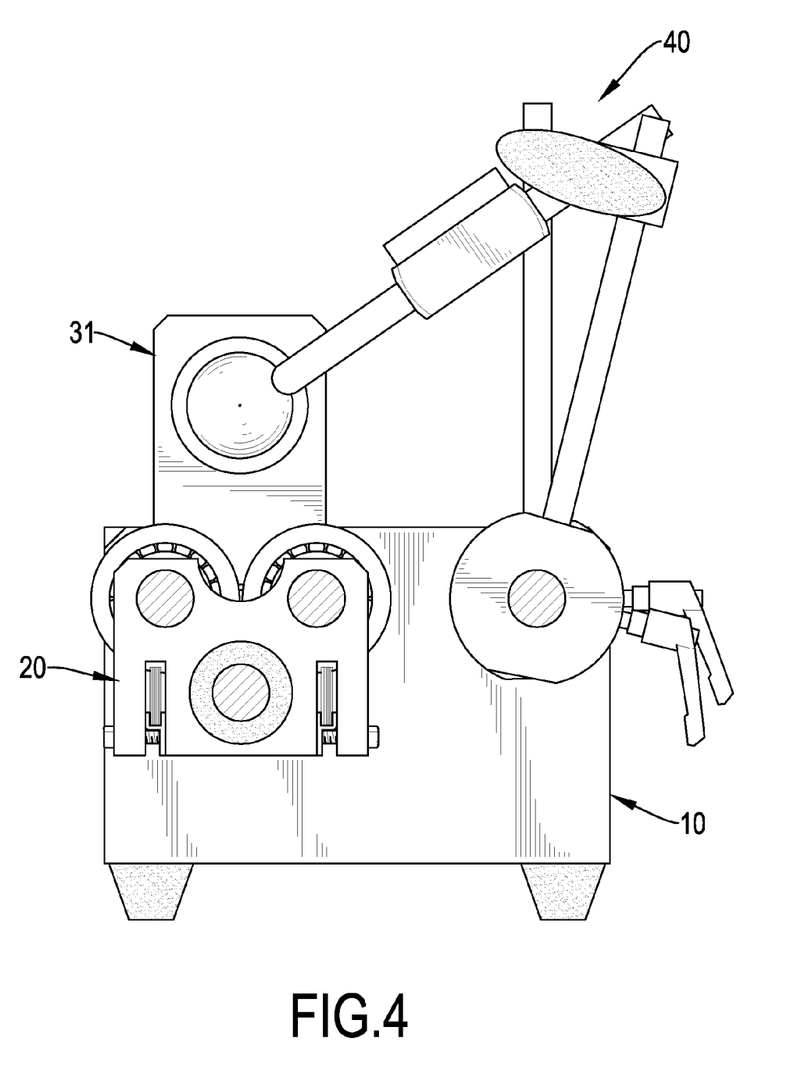
FIG. 4 is a cross-sectional side view of the straightness measuring instrument in FIG. 1.

With reference to FIGS. 1 and 4, the measure apparatus 40 is mounted movably on the base 10 and has a clamp 41 and an indicator 42 mounted on the clamp 41. The clamp 41 is mounted movably around the sliding rod 15.

Figure 5:
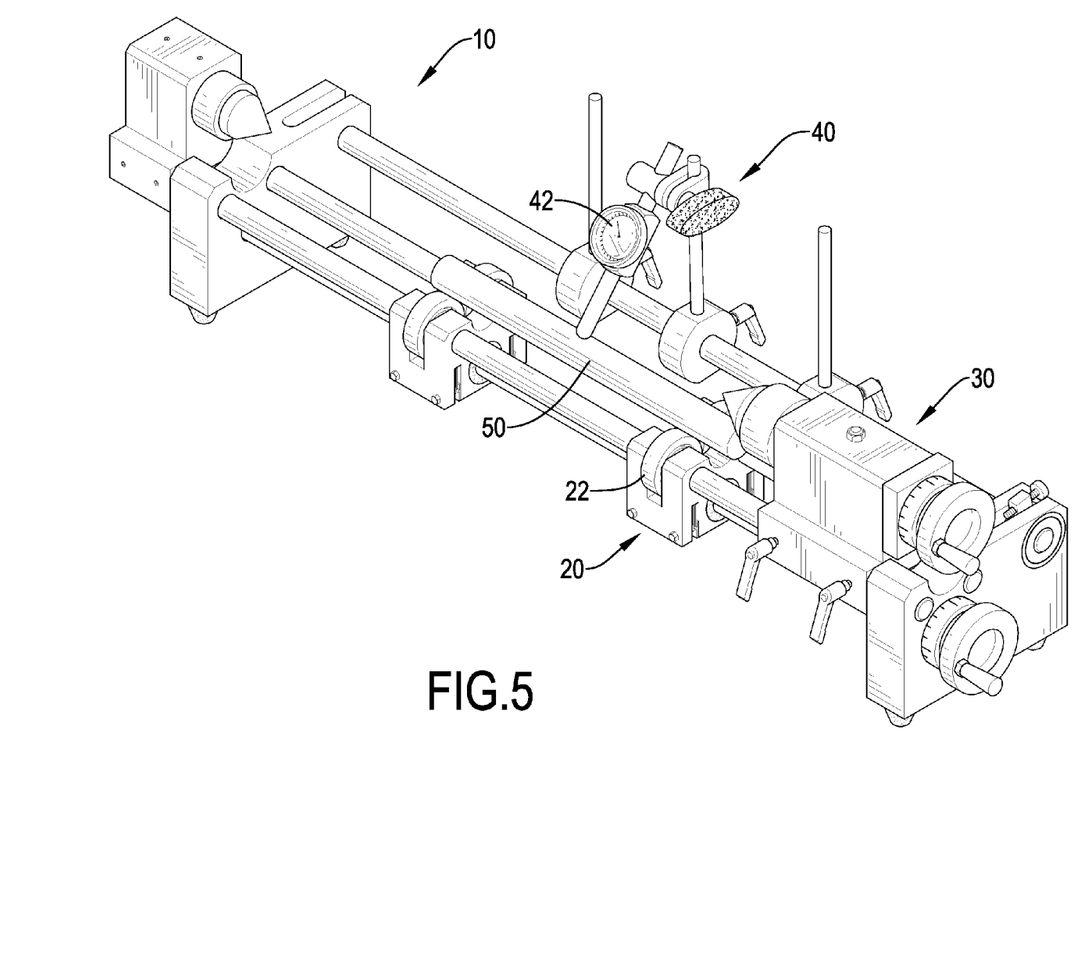
FIG. 5 is an operational perspective view of the straightness measuring instrument in FIG. 1.

With reference to FIGS. 1, 4 and 5, a workpiece 50 may be a long round stick or a tube, and is placed on the loading units 20. A distance between the two loading units 20 is adjustable, depending on the length of the workpiece 50. The two ends of the workpiece 50 are respectively placed on the bearing units 22. The bearing units 22 and the workpiece 50 can be rotated synchronously by rotating the driving mechanism 14. The indicator 42 can abut on the periphery of the workpiece 50 for measuring the variance of the diameter of the workpiece 50 and indicating the straightness of the workpiece 50.

With reference to FIG. 3, when the bearing units 22 are rotating, the brushes 24 clean the periphery of the bearing units 22 for keeping the rotation smooth and prevent chips of the workpiece 50 from falling into the bearing units 22.

Figure 6:
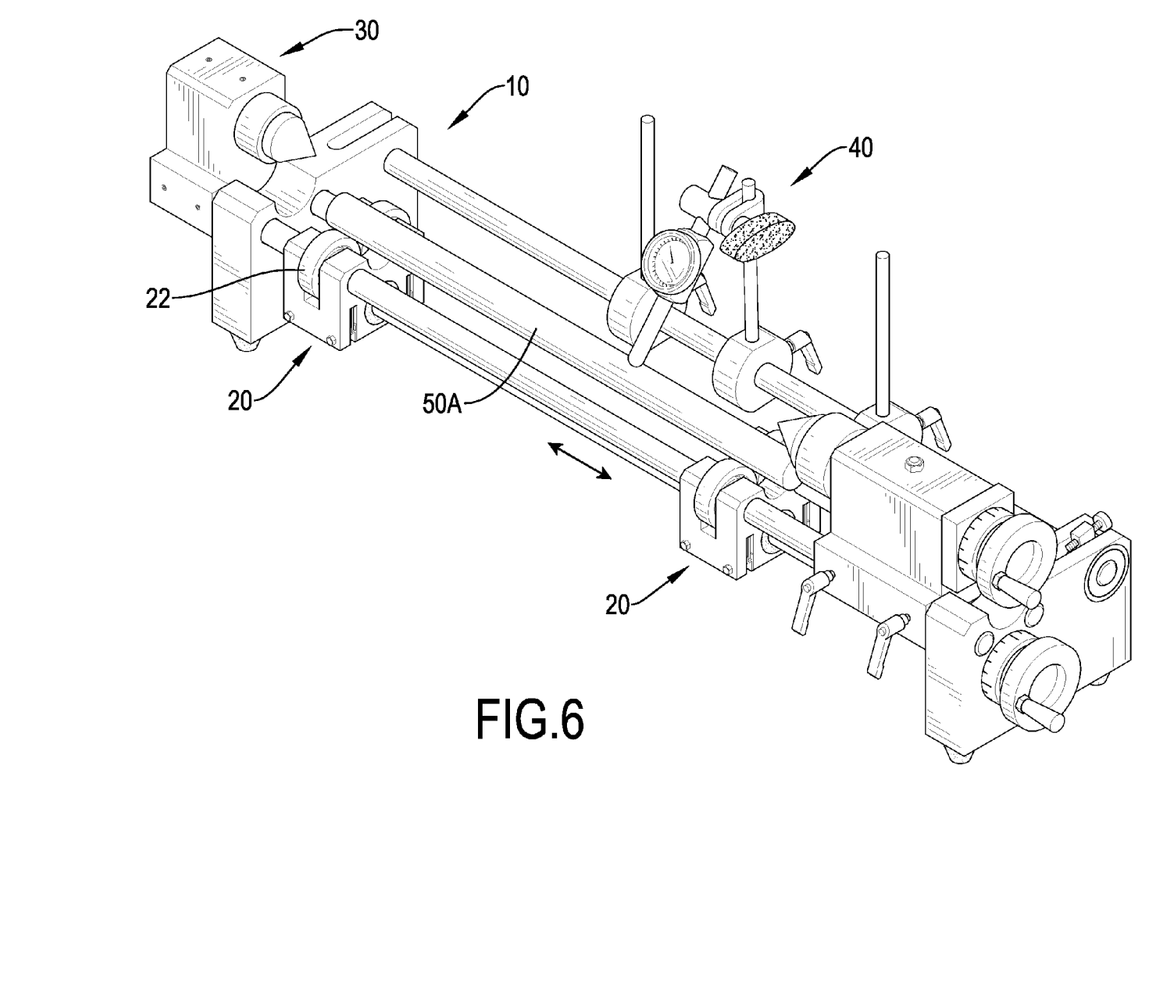
FIG. 6 is another operational perspective view of the straightness measuring instrument in FIG. 1.

With reference to FIG. 6, when a longer workpiece 50A is to be measured, the loading units 20 are moved respectively toward the two sides of the base 10 and provide a suitable distance between the two loading units 20 for placing the workpiece 50A.

Figure 7:
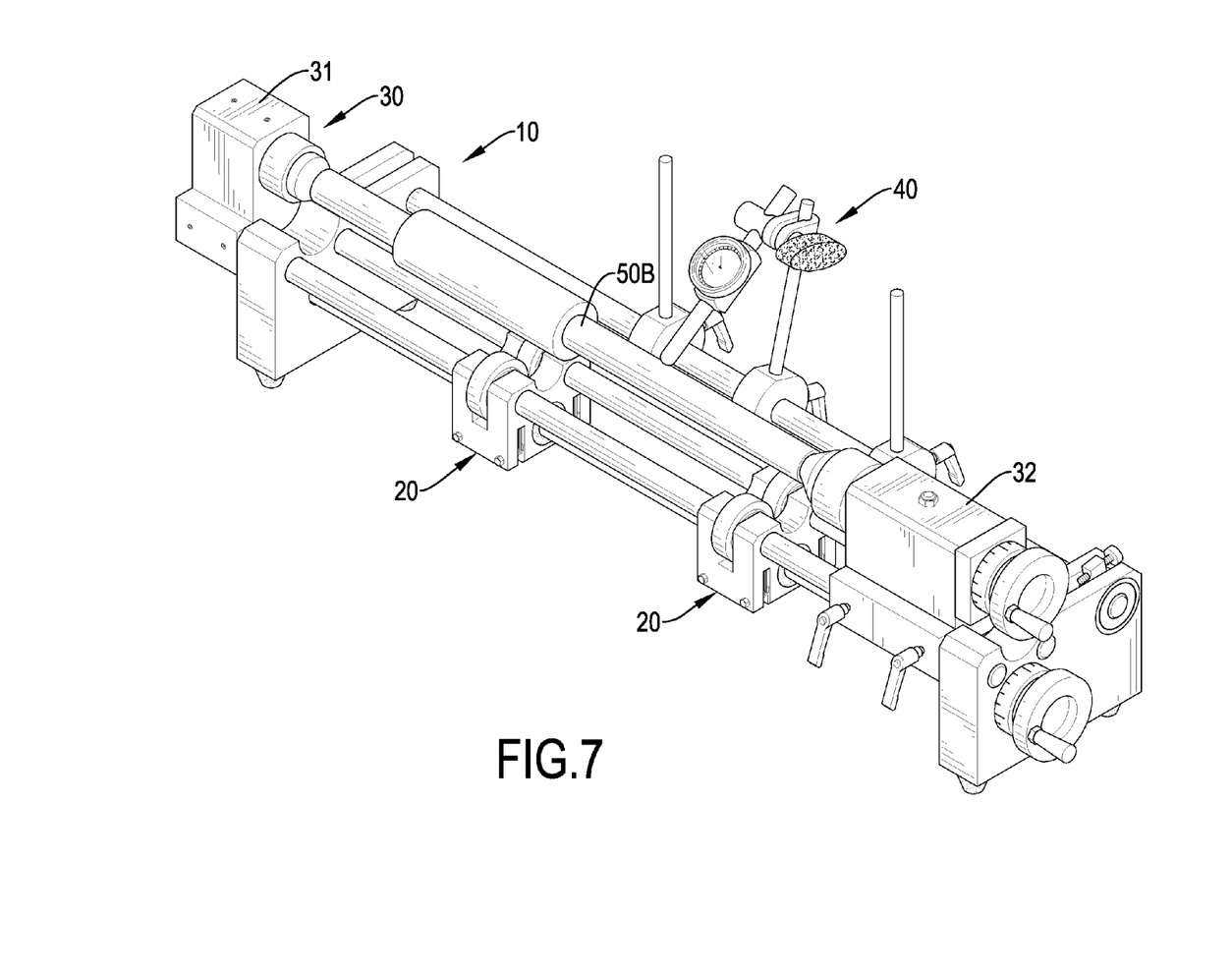
FIG. 7 is still another operational perspective view of the straightness measuring instrument in FIG. 1.

With reference to FIG. 7, a workpiece 50B may have different diameters at different parts of the workpiece 50B or is a tube. One end of the workpiece 50B abuts against the fixed seat 31. The movable seat 32 is moved adjacent and abuts against another end of the workpiece 50B, and then the handwheel 323 is rotated to move the movable center 322 toward the center 312 for clamping the workpiece 50B tightly. The indicator 42 of the measure apparatus 40 abuts against a measurement position on the workpiece 50B, such that a user can then rotate the workpiece 50B by hands to measure the workpiece 50B.

Figure 8:
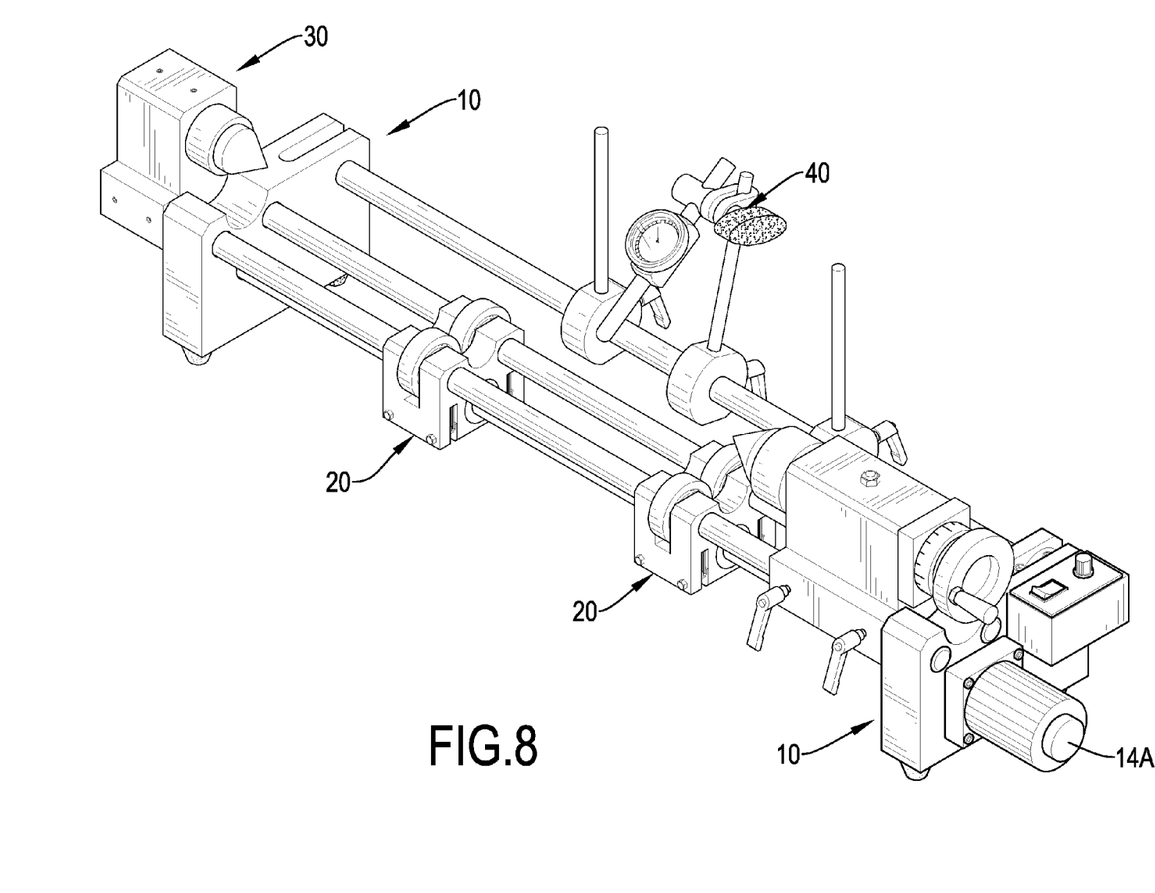
FIG. 8 is a perspective view of a second embodiment of the straightness measuring instrument in accordance with the present invention.

With reference to FIG. 8, in a second embodiment of a straightness measuring instrument in accordance with the present invention, the elements and effects of the second embodiment are same with those of the first embodiment except the driving mechanism 14A is a motor.

Figure 9:
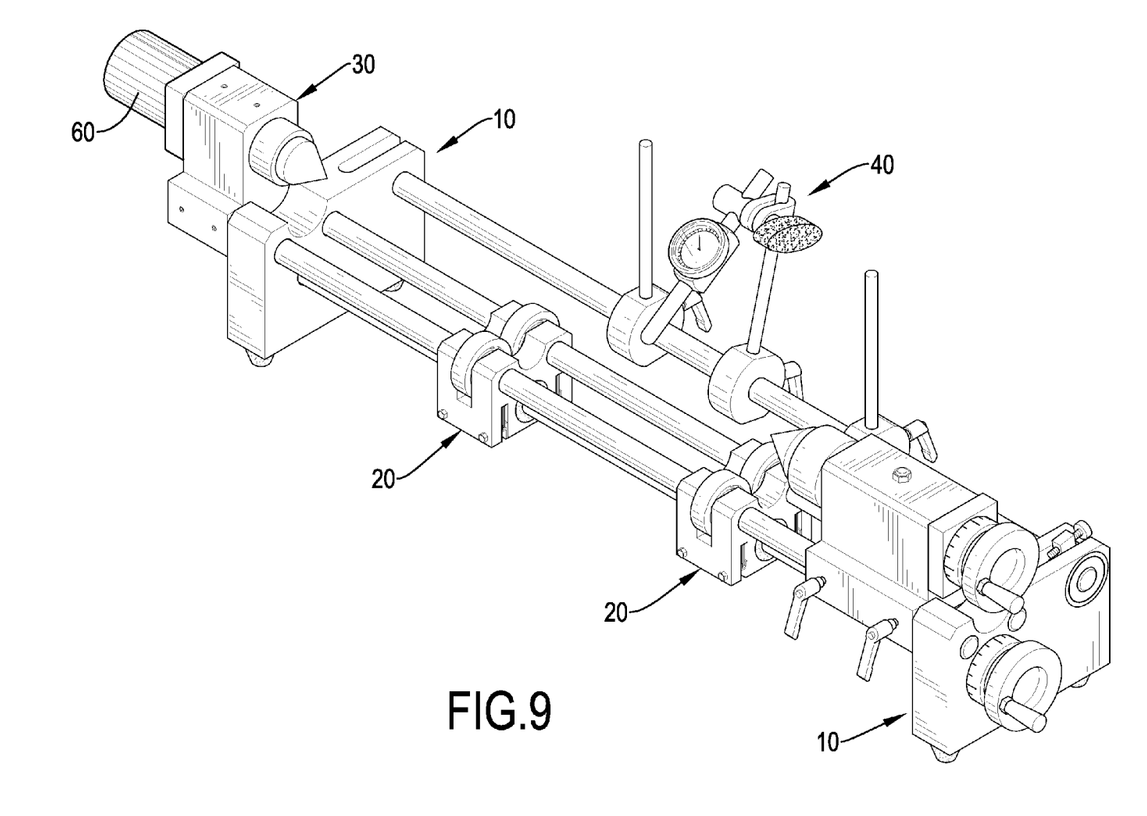
FIG. 9 is a perspective view of a third embodiment of the straightness measuring instrument in accordance with the present invention.

With reference to FIG. 9, in a third embodiment of a straightness measuring instrument in accordance with the present invention, the elements and effects of the third embodiment are same with those of the first embodiment except the fixed seat 31 of the center clamping apparatus 30 further includes a motor 60. The center 312 is connected with the motor 60 and is rotated by the motor 60. A workpiece can be rotated by the center 312 instead of manual rotation.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A straightness measuring instrument comprising:
    a base including
        two support seats being upright straight and parallel with each other;
        two support rods mounted through one side of the support seats and parallel with each other;
        a driving rod mounted through the support seats and located under the support rods;
        a driving mechanism mounted on one of the support seats and connected with the driving rod; and
        a sliding rod mounted through another side of the support seats and parallel to the support rods;
    two loading units mounted on the base and arranged along an axial direction of the support rods at intervals; each loading unit including
        a loading seat mounted movably around the support rods and the driving rod;
        two bearing units mounted in the loading seat and mounted around the support rods;
        a driving wheel mounted in the loading seat, mounted around the driving rod, and abutting against the bearing units;
    a center clamping apparatus mounted on the base and including
        a fixed seat mounted on one of the support seats;
        a movable seat movably mounted around the support rods and located opposite to the fixed seat; the loading units located between the fixed seat and the movable seat; and
    a measure apparatus mounted movably around the sliding rod.

2. The straightness measuring instrument as claimed in claim 1, wherein the movable seat has a movable seat base, a movable center, and a handwheel, the movable seat base is mounted movably around the support rods, the movable center is telescopic, is mounted on the movable seat base and faces toward the fixed seat, the handwheel is mounted on the movable seat base, is located opposite to the movable center and connected with the movable center.

3. The straightness measuring instrument as claimed in claim 2, wherein the movable seat further includes two locking units mounted on one side of the movable seat base.

4. The straightness measuring instrument as claimed in claim 1, wherein each loading unit further has at least one brush, the loading seat has at least one brush recess formed on a bottom face of the loading seat, and the at least one brush is mounted correspondingly in the at least one brush recess.

5. The straightness measuring instrument as claimed in claim 2, wherein each loading unit further has at least one brush, the loading seat has at least one brush recess formed on a bottom face of the loading seat, and the at least one brush is mounted correspondingly in the at least one brush recess.

6. The straightness measuring instrument as claimed in claim 3, wherein each loading unit further has at least one brush, the loading seat has at least one brush recess formed on a bottom face of the loading seat, and the at least one brush is mounted correspondingly in the at least one brush recess.

7. The straightness measuring instrument as claimed in claim 6, wherein two brushes and two brush recesses are implemented, and the two brush recesses are located under and corresponding to the support rods.

8. The straightness measuring instrument as claimed in claim 7, wherein the loading seat has a top face, an abutment recess and a bearing recess, the abutment recess is semi-circular in cross-section and is formed on the top face of the loading seat, and the bearing recess is formed on the top face of the loading seat and is formed across the abutment recess perpendicularly.

9. The straightness measuring instrument as claimed in claim 8, wherein the driving wheel has multiple rubber rings mounted around a periphery of the driving wheel, the rubber rings abuts against a bottom of each bearing unit.

10. The straightness measuring instrument as claimed in claim 9, wherein the driving mechanism is a handwheel.

11. The straightness measuring instrument as claimed in claim 9, wherein the driving mechanism is a motor.

12. The straightness measuring instrument as claimed in claim 10, wherein the fixed seat further includes a motor mounted on a back of the fixed seat.

13. The straightness measuring instrument as claimed in claim 11, wherein the fixed seat further includes a motor mounted on a back of the fixed seat.

* * * * *